United States Patent [19]
Tsuchiya et al.

[11] 4,253,930
[45] Mar. 3, 1981

[54] PROCESS FOR ELECTRODEPOSITING CATIONIC COMPOSITIONS

[75] Inventors: Yasuyuki Tsuchiya, Ichihara; Akio Ichikawa, Kawasaki; Kastuyoshi Yamasoe, Yokohama, all of Japan

[73] Assignee: Nippon Paint Co., Ltd., Japan

[21] Appl. No.: 57,672

[22] Filed: Jul. 16, 1979

[51] Int. Cl.³ .............................................. C25D 13/06
[52] U.S. Cl. ................................................ 204/181 C
[58] Field of Search .................................... 204/181 C

[56] References Cited

U.S. PATENT DOCUMENTS

| | | | |
|---|---|---|---|
| 3,984,299 | 10/1976 | Jerabek | 204/181 C |
| 4,007,154 | 2/1977 | Schimmel et al. | 260/3 EP |
| 4,009,133 | 2/1977 | Jones | 204/181 C |
| 4,017,372 | 4/1977 | Wayener et al. | 204/181 C |
| 4,081,341 | 3/1978 | Christenson et al. | 204/181 C |

Primary Examiner—Howard S. Williams
Attorney, Agent, or Firm—Wenderoth, Lind & Ponack

[57] ABSTRACT

A resin useful for electrocoating is obtained by reacting a reaction product of an epoxy group-containing compound with a carboxyl group-containing butadiene/acrylonitrile copolymer with simultaneously or separately an amino group-containing compound and a fully or a partially blocked isocyanato group-containing compound, and a composition comprising said resin or a composition comprising a reaction product obtained by reacting a reaction product of an epoxy group-containing compound and a carboxyl group-containing butadiene/acrylonitrile copolymer with an amino group-containing compound and a fully or partially blocked isocyanato group-containing compound is used for a cathodical electrodeposition.

15 Claims, No Drawings

PROCESS FOR ELECTRODEPOSITING CATIONIC COMPOSITIONS

DETAILED DESCRIPTION OF INVENTION

The present invention relates to an electrocoating composition.

As the vehicles for cationic electrocoating composition, there have already been developed various kinds of cationic resins for practical application. Especially, the cationic resin described in Japanese Patent Publication (Unexamined) No. 18746/1977 corresponding to U.S. Pat. Nos. 4,007,154 and 4,009,133) and Japanese Patent Publication No. 103135/1976 (corresponding to U.S. Pat. No. 3,984,299), with which the formed electrocoated film shows extremely high corrosion-resistance and solvent-resistance, is highly regarded as a vehicle for the cationic electrocoating composition. However, even with the above cationic resin, the formed coating films were still not quite satisfactory in respect to the adhesion test or Ericksen test.

The present invention provides the vehicle resin which exhibits excellent properties in adhesion and Ericksen test of the coating film with preservation of the desirable characteristics of the vehicles for the above electrode-position coating composition and the cationic electrocoating composition obtainable by incorporating them.

Further, the vehicle resin for the electrocoating composition of the present invention relates specifically to an improvement to the vehicle described in Japanese Patent Publication (Unexamined) No. 18746/1977. The use of a butadiene/acrylonitrile copolymer as a component of a vehicle resin in the present invention provides outstanding effects in turnover, impact resistance, selectivity for surface treatment, etc. in addition to the above properties.

The present invention provides a resin useful for electrocoating, which is obtained by reacting a reaction product (A) of an epoxy group-containing compound with a carboxyl group-containing butadiene/acrylonitrile copplymer at the rate of 1 epoxy equivalent of the former to about 0.2 to 0.7 equivalent of the free carboxyl group of the latter with simultaneously or separately an amino group-containing compound and a fully or a partially blocked isocyanato group-containing compound, and a composition comprising said resin.

Further, the present invention provides an electrocoating composition comprising (1) a reaction product obtained by reacting a reaction product (A) of an epoxy group-containing compound and a carboxyl group-containing butadiene/acrylonitrile copolymer at the rate of 1 epoxy equivalent of the former to about 0.2 to 0.7 equivalent of the free carboxyl group of the latter with an amino group-containing compound, and (2) a fully or partially blocked isocyanato group-containing compound.

Furthermore, the present invention provides a process for cathodically electrodepositing the above coating compositions.

In the present invention, the epoxy-containing compound may be either a monomer or a polymer. The epoxy compounds prepared from polyglycidyl ether of polyphenol of bisphenol A, novoloc resin, analogous phenol resin, and others, are commercially available. Typically, 1,2- epoxy-containing compounds are used. Particularly preferred epoxy group-containing compounds are those having the epoxy equivalent of about 300 to 1000.

These epoxy group-containing compound may per se have the groups having the active hydrogen such as hydroxyl group, or may be partially etherified with alcohols, such as polypropylene glycol, polyethylene glycol, caprolactam, diols, and the like. Alternatively, they may be partially esterified with carboxylic acid, dimer acid, adipic acid, sebacic acid, and the like.

The carboxyl group-containing butadiene/acrylonitrile copolymer means the copolymer which has acrylonitrile and butadiene moieties in the main chain and has a carboxyl group as derived by partial oxidation. Preferred copolymers are those containing about 8 to 30% by weight of acrylonitrile moiety and about 70 to 92% by weight of butadiene moiety, having about 1.5 to 2.5 free carboxyl groups in a molecule. The number average molecular weight of the copolymer is about 1000 to 4000, preferably about 2000 to 3500.

The carboxyl groups of the carboxyl group-containing butadiene/acrylonitrile copolymer may be partially esterified. They may be partially copolymerized with other polymerizable monomers such as methacrylonitrile, acrylates, methacrylates, styrene, chloroprene, isoprene and the like.

The isocyanato group-containing compounds to be used in the present invention are derived from organic polyisocyanate, preferably organic diisocyanate. The isocyanato group may be fully blocked or partially blocked.

The organic polyisocyanates are not limited but but all polyisocyanates which have hitherto been used as vehicle components for electrocoating composition are usable. They are, for example, aliphatic diisocyanate, alicyclic diisocyanate, aromatic diisocyanate, aliphatic-aromatic diisocyanate, nucleus-substituted aromatic diisocyanate (e.g., dianisidine diisocyanate), polyfunctional isocyanate (e.g., triisocyanate, tetraisocyanate), polymerized polyisocyanate (e.g., toluene diisocyanate dimer, trimer, etc.).

As the blocking agent for the organic polyisocyanates, there may be exemplified aliphatic alcohols (e.g., aliphatic alcohols having 1 to 10 carbon atoms), aromatic alkyl alcohols (e.g., phenyl carbinol), ether bond-containing alcohols (e.g., cellosolves), phenols, and oximes (e.g., methylethylketoxime). The isocyanates blocked by oximes and phenols are particularly preferred because they are reactive at relatively low temperatures. The blocking agents of high molecular weight and relatively non-volatile property may be used in a small amount.

The amino group-containing compounds may be either of primary amine, secondary amine, tertiary amine, polyamines, or alkanolamines.

Preferred amines are ethylenediamine, diethylenetriamine, dimethylcyclohexylamine, dimethylethanolamine, methyldiethanolamine, dimethylamino-2-propanol, diethylamino-ethoxyethanol, di-n-propanolamine, and the like. Particularly preferred are ethylene diamine and methylethanolamine.

In case of the use of the tertiary amine having no active hydrogen, it is used as acid amino salt by acidifying with suitable acid such as boric acid, phosphoric acid, sulfuric acid, acetic acid, lactic acid and the like.

In preparing the resin of the present invention, firstly the epoxy group-containing compound is reacted with the carboxyl group-containing butadiene/acrylonitrile copolymer [hereinafter the reaction product under this process is referred to as reaction product (A)]. In this case, the reaction between the epoxy group-containing compound and the butadiene/acrylonitrile copolymer is carried out at the ratio of 1 epoxy equivalent of epoxy group of the former to 0.2 to 0.7 equivalent of carboxyl group of the latter.

The reaction product (A) may be further reacted with the amino group-containing compound and the partially blocked isocyanato group-containing compound, or may be simply mixed with the isocyanato group-containing compound.

The reaction of the reaction product (A) with the amino group-containing compound and the partially blocked isocyanato group-containing compound may be carried out simultaneously or separately. For example, either of the following methods may be adopted:

(1) a method of previously reacting an amino group-containing compound with the reaction product (A), and reacting therewith the isocyanato group-containing compound, (2) a method of reacting an isocyanato group-containing compound with the reaction product (A), and reacting therewith an amino group-containing compound.

(3) a method of reacting simultaneously the reaction product (A), the isocyanato group-containing compound, and the amino group-containing compound, and (4) a method of reacting in advance the isocyanato group-containing compound and the amino group-containing compound, and reacting therewith the reaction product (A).

Practical use of the above methods may be adequately achieved by one skilled in the art.

The reaction may be carried out at the temperature at which the blocked isocyanate is stable and the reaction between the amino group-containing compound and the epoxy-group of the reaction product (A) is effected. Whereas the temperature at which the blocked isocyanate is stable may differ greatly depending on the kind of the blocking agent, usually a blocking agent stable at 70° C. to 200° C. may be used and the reaction between the epoxy-group and the amino group-containing compound may be carried out at temperature at which the blocked isocyanate is stable. In the process of the foregoing (1), the reaction procut (A) is reacted previously with the amino group-containing compound, so that the use of a wider variety of blocking agents becomes feasible.

Where the amino group-containing compound has no active hydrogen or where the reaction product [hereinafter the reaction product of this process is referred to as reaction product (B)] between the isocyanato group-containing compound and the amino group-containing compound in the foregoing method (4) has no active hydrogen attributed to amino group-containing compound, it may be so processed that an amino group-containing compound acidified with a suitable acid may be reacted with the epoxy-group of the reacton product (A). By this process a quaternary ammonium-containing resin is obtainable.

In the present invention, the typical embodiment is a method of employing a fully blocked isocyanato group-containing compound. In such process, a partially blocked isocyanato group-containing compound may be used, in which case the reaction progresses gradually.

The fully or partially blocked isocyanato group-containing compound may be mixed before the reaction between the reaction product (A) and the amino group-containing compound, or it may be mixed before the preparation of the electrodeposition bath.

Blocked isocyanates may be used in an amount sufficient to induce such a state that, when the electrocoated film is baked, an isocyanato group reacts with a hydroxyl group or amino group in the resin to give a cured film. Generally the fully or partially blocked isocyanato group-containing compound is used in an amount of about 5 to 50% by weight to said resin.

The amount of the amino group-containing compound to be used is obtained by calculation so as to make it approximately equivalent to the epoxy group.

The resins obtained by the present invention process may be used by further modifying with other resin component or by blending with other resin, depending on the object of use.

The cationic resin of the present invention partially acidified with an organic acid such as acetic acid, lactic acid or inorganic acid such as boric acid, phosphoric acid, sulfuric acid or hydrochloric acid, preferably the organic acid, either solely or in combination, so as to make it dissolved or dispersed in water.

In order to obtain a composition for cathodic electrodeposition, this resin is suitably mixed with pigment or solvent. Of course, other desired additives such as antioxidizing agent or surfactant may be added.

The present invention is hereafter illustrated with reference to following examples, which, however, are not to be construed as limiting the invention to their details.

EXAMPLE 1

| Ingredient | Parts by weight |
| --- | --- |
| EPON 1002[1] | 416 |
| Hicar-CTBN 1300-13[2] | 104 |
| toluene diisocyanate blocked with 2-ethylhexanol (70% solution) | 250 |
| reaction product of diethylene triamine and MIBK(methyl isobutyl ketone) | 31.2 |
| methylethanolamine | 25.5 |
| n-hexylcellosolve | 42.3 |
| water | 1032 |
| acetic acid | 14 |

[1]Reaction product between epichlorohydrin and bisphenol A; epoxy equivalent about 630; commercialized from Shell Chemical Company.
[2]Polycarboxybutadiene acrylonitrile copolymer having the number average molecular weight of 3400, the average number of carboxyl group of 1.9 and 27% by weight of an acrylonitrile moiety. (trade name, available from B.F. Goodrich Chemical, U.S.A.)

EPON 1002 and Hicar-CTBN 1300-13 are heated at 130°–150° C. for about 2 hours, then toluene diisocyanate blocked with 2-ethylhexanol is added thereto, and the mixture is reacted under heat at 110° C. To this, the reaction product of diethylene triamine and MIBK and methylethanolamine are added, and the mixture, kept at 120° C., is incorporated with n-hexylcellosolve. Water and acetic acid are mixed with the resultant to give a resinous varnish having 36% solid component.

On the other hand, a pigment paste is prepared from the following charge.

| Ingredient | Parts by weight | Solids |
| --- | --- | --- |
| toluene diisocyanate semi-blocked with 2-ethylhexanol (in MIBK) | 320 | 304 |
| dimethylethanolamine | 87.2 | 87.2 |
| aqueous solution of lactic acid | 117.6 | 88.2 |

-continued

| Ingredient | Parts by weight | Solids |
|---|---|---|
| butyl cellosolve | 39.2 | — |

By the use of an appropriate reaction vessel, toluene diisocyanate semi-blocked with 2-ethylhexanol is added to dimethyl ethanolamine at room temperature. The mixture reacts exothermically. It is stirred at 80° C. for 1 hour. To this, lactic acid is charged, and further butyl cellosolve is added. The reaction mixture is stirred at 65° C. for about 1 hour to give the desired quaternarizing agent.

Then, a dissolved vehicle containing the reaction product between the epoxy group-containing organic compound and the above blocked isocyanato group-containing organic amine is prepared from the following charge.

| Ingredient | Parts by weight | Solids |
|---|---|---|
| EPON 829[(3)] | 710.0 | 681.2 |
| Bisphenol A | 289.6 | 289.6 |
| toluene diisocyanate semi-blocked with 2-ethylhexanol (methyl isobutyl ketone) | 406.4 | 286.1 |
| above quaternarizing agent | 496.3 | 421.9 |
| deionized water | 71.2 | — |
| butylcellosolve | 56.76 | — |

[(3)]EPON 829: Reaction product between epichlorohydrin and bisphenol A; epoxy equivalent about 193–203; commercialized from Shell Chemical Company.

EPON 829 and Bisphenol A are charged into a suitable reactor and are heated under nitrogen atmosphere to 150°–160° C. It is an initial exothermic reaction. The reaction mixture is subjected to thermal reaction at 150°–160° C. for about 1 hour. Then, after cooling to 120° C., the mixture is incorporated with toluene diisocyanate semiblocked with 2-ethylhexanol. The reaction mixture is kept at 110°–120° C. for about 1 hour, after which it is incorporated with butyl cellosolve.

Thereafter, the mixture is cooled to 85°–95° C., homogenized, incorporated with water, and further with quaternarizing agent. The temperature of the reaction mixture is kept at 80°–85° C. until the acid value comes to 1.

By the use of this resin vehicle a pigment paste is prepared under the following charge.

| Ingredient | Parts by weight |
|---|---|
| vehicle | 2087 |
| aluminium silicate | 1853 |
| zinc silicate | 318 |
| carbon black | 256 |
| strontium chromate | 159 |

The above components are charged in an attritor, dispersed for about 11–12 hours to Hegman No. 6–7. Further, deionized water is added to the mixture to make it into the desired concentration. The formed paste has excellent thermal stability and does not cause separation or precipitation even after the storage at 120° C. for 1 week.

The above resinous varnish (1555 parts by weight), pigment paste (297 parts by weight), and water (1749 parts by weight) were mixed to make an electrodeposition bath, which was applied by cathodic electrodeposition to a zinc phosphate treated steel panel and a bare steel panel. The results are shown in Table 1. The coating showed good appearance even when the composition was applied by electrodeposition to a zinc phosphate treated steel panel having unevenness of treatment.

EXAMPLE 2

Resinous varnish is prepared under the following charge:

| Ingredient | Parts by weight |
|---|---|
| EPON 1001[(4)] | 370 |
| Hicar-CTBN 1300-13 | 92 |
| polycaprolactam diol | 88 |
| toluene diisocyanate blocked with 2-ethylhexanol (70% solution) | 233 |
| reaction product of diethylene triamine and MIBK | 31.2 |
| methylethanolamine | 25.5 |
| n-hexyl cellosolve | 42.3 |
| water | 1032 |
| acetic acid | 14 |

[(4)]Reaction product between epichlorohydrin and bisphenol A; epoxy equivalent about 450 to 500; commercialized from Shell Chemical Company.

EPON 1001 and Hicar-CTBN were heated at 130°–150° C. and then the resultant was subjected to the reaction with polycaprolactam diol. The epoxy equivalent was 1394. Hereinafter, in the manner as in Example 1, resinous varnish was obtained. and electrocoating was carried out under the same conditions as described in Example 1.

COMPARATIVE EXAMPLE

In the following charge, resinous varnish was prepared.

| Ingredient | Parts by weight |
|---|---|
| EPON 1001 | 291 |
| polycaprolactam diol | 105 |
| toluene diisocyanate blocked with 2-ethylhexanol (70% solution) | 250 |
| reaction product of diethylene triamine and MIBK | 29 |
| methylethanolamine | 23 |
| n-hexyl cellosolve | 40 |
| water | 1052 |
| acetic acid | 16 |

EPON 1001 and polycaprolactam diol were heated at about 130° C., after which toluene diisocyanate blocked with 2-ethylhexanol was added thereto, and the mixture was heated at 110° C. Subsequent treatments were made in the manner as in Example 1 to obtain resinous varnish, with which electrodeposition coating was carried out under the same conditions of Example 1. The results are shown in Table 1.

TABLE 1

| Item | | Example 1 | Example 2 | Comparative Example | |
|---|---|---|---|---|---|
| Rupture voltage (V) | | 350 | 370 | 350 | |
| coating voltage (V) | | 150 | 200 | 150 | |
| Film thickness (μ) | | 20 | 20 | 20 | |
| Salt spray resistance | | ○ | ○ | ○ | Bare steel panel 360H |
| | | ○ | ○ | ○ | Zinc phosphate treated steel panel 800H |
| Ericksen (mm) | | 6.4 | 6.4 | 2.5 | |
| Impact resistance (cm) | Surface | 50< | 50< | 50 | ½" × 500g |
| | Reverse surface | 50< | 50< | 10> | |
| Moisture-resistance (after top coating) | | 100/100 | 100/100 | 20/100 | Zinc phosphate treated steel panel, 50° C. × 240H |
| Appearance | | ○ | ○ | × | Zinc phosphate treated steel panel having unevenness of treatment |

What is claimed is:

1. In a method of coating a conductive substrate serving as a cathode which method comprises passing an electric current between an anode and said cathode in electrical contact with a water-dispersed composition comprising a resin obtained by reacting a reaction product (A) of an epoxy group-containing compound with a carboxyl group-containing butadiene/acrylonitrile copolymer at the rate of 1 epoxy equivalent of the former to about 0.2 to 0.7 equivalent of the free carboxyl group of the latter with simultaneously or separately an amino group-containing compound and a partially blocked isocyanato group-containing compound.

2. The method according to claim 1, wherein the epoxy group-containing compound is a 1,2-epoxy group-containing compound having an epoxy equivalent of about 300 to 1000.

3. The method according to claim 1, wherein the carboxyl group-containing butadiene/acrylonitrile copolymer contains about 8 to 30% by weight of an acrylonitrile moiety and has the average number of carboxyl group of about 1.5 to 2.5 in a molecule and the number average molecular weight of about 1000 to 4000; said carboxyl group may be partially esterified.

4. The method according to claim 1, wherein the resin is that obtained by first reacting an isocyanato group-containing compound with the reaction product (A) and then reacting an amino group-containing compound therewith.

5. The method according to claim 1, wherein the resin is that obtained by first reacting an amino group-containing compound with the reaction product (A) and then reacting an isocyanato group-containing compound therewith.

6. The method according to claim 1, wherein the amino group-containing compound contains an active hydrogen.

7. The method according to claim 1, wherein the amino group-containing compound, in case of having no active hydrogen, is used as an acid salt.

8. The method according to claim 1, wherein the resin is that obtained by reacting the reaction product (A) with a reaction product (B) of an isocyanato group-containing compound and an amino group-containing compound.

9. The method according to claim 8, wherein the reaction product (B), in case of having no active hydrogen attributed to the amino group-containing compound, is used as an acid salt.

10. The electrocoated substrate produced by the method of claim 1.

11. In a method of coating a conductive substrate serving as a cathode which method comprises passing an electric current between an anode and said cathode in electrical contact with a water-dispersed composition comprising (1) a reaction product obtained by reacting a reaction product (A) of an epoxy group-containing compound and a carboxyl group-containing butadiene/acrylonitrile copolymer at the rate of 1 epoxy equivalent of the former to about 0.2 to 0.7 equivalent of the free carboxyl group of the latter with an amino group-containing compound, and (2) a fully or partially blocked isocyanato group-containing compound.

12. The method according to claim 11, wherein the epoxy group-containing compound is 1,2-epoxy group-containing compound having about 300 to 1000 epoxy equivalents.

13. The method according to claim 11, wherein the carboxyl group-containing butadiene/acrylonitrile copolymer contains about 8 to 30% by weight of acrylonitrile moiety and has the average carboxyl group number of about 1.5 to 2.5 and the number average molecular weight of about 1000 to 4000 in a molecule, and said caroxyl group may be partially esterified.

14. The method according to claim 11, wherein the composition is obtained by blending the fully blocked isocyanato group-containing compound with the reaction product (A) and/or the amino group-containing compound before the reaction of the reaction product (A) with the amino group-containing compound.

15. The electrocoated substrate produced by the method of claim 11.

* * * * *